United States Patent
Scharp

(10) Patent No.: US 8,689,743 B2
(45) Date of Patent: Apr. 8, 2014

(54) PISTON FOR AN INTERNAL COMBUSTION ENGINE

(75) Inventor: Rainer Scharp, Vaihingen (DE)

(73) Assignee: MAHLE International GmbH, Stuttgart (DE)

( * ) Notice: Subject to any disclaimer, the term of this patent is extended or adjusted under 35 U.S.C. 154(b) by 7 days.

(21) Appl. No.: 13/408,023

(22) Filed: Feb. 29, 2012

(65) Prior Publication Data

US 2012/0260868 A1 Oct. 18, 2012

(30) Foreign Application Priority Data

Mar. 1, 2011 (DE) .................. 10 2011 012 685

(51) Int. Cl.
*F02F 3/16* (2006.01)

(52) U.S. Cl.
USPC .............. 123/41.39; 123/41.35; 123/193.6; 92/158; 92/160

(58) Field of Classification Search
USPC .......... 123/41.34, 41.35, 41.39, 193.6, 193.1; 92/158, 160, 208
See application file for complete search history.

(56) References Cited

U.S. PATENT DOCUMENTS

| | | | |
|---|---|---|---|
| 1,764,465 A | | 6/1930 | Nute |
| 2,911,963 A | * | 11/1959 | Goldsmith ................. 123/41.39 |
| 3,161,188 A | * | 12/1964 | Liebel et al. ............... 123/41.39 |
| 3,177,861 A | * | 4/1965 | Quillian, Jr. ............... 123/193.1 |
| 3,424,138 A | * | 1/1969 | Dreisin ....................... 123/41.38 |
| 4,280,455 A | | 7/1981 | Yamaguchi et al. |
| 4,599,935 A | * | 7/1986 | Ellermann et al. ............. 92/159 |
| 5,005,541 A | * | 4/1991 | Yamamoto et al. ......... 123/90.35 |
| 7,918,155 B2 | * | 4/2011 | Lapp et al. ..................... 92/231 |
| 8,356,550 B2 | * | 1/2013 | Kim .................................. 92/159 |
| 2008/0202330 A1 | * | 8/2008 | Ottliczky et al. ............... 92/208 |
| 2010/0018388 A1 | * | 1/2010 | Kim ................................ 92/158 |

FOREIGN PATENT DOCUMENTS

| | | |
|---|---|---|
| DE | 12 16 041 | 5/1966 |
| DE | 33 38 474 | 5/1985 |
| DE | 35 06 399 | 8/1986 |
| DE | 36 00 749 | 7/1987 |

(Continued)

OTHER PUBLICATIONS

International Search Report dated Jun. 25, 2012 in corresponding PCT Application No. PCT/DE2012/000197 with English translation of relevant parts.

(Continued)

*Primary Examiner* — Noah Kamen
*Assistant Examiner* — Grant Moubry
(74) *Attorney, Agent, or Firm* — Collard & Roe, P.C.

(57) ABSTRACT

A piston for an internal combustion engine has a piston head and a piston skirt. The piston head has a circumferential ring belt and a circumferential cooling channel. The piston skirt has a working surface assigned to its major thrust side and to its minor thrust side. A bore that proceeds from the cooling channel is provided, which ends in the working surface assigned to the major thrust side, and is disposed at an incline, in such a manner that the bore exit encloses an acute angle ($\alpha$) with the center axis (M) of the piston. An opening is formed in the working surface, and a deflection surface inclined relative to the working surface is provided between the bore and the bore exit. The working surface assigned to the major thrust side has a depression which forms at least one oil capture region above the opening.

5 Claims, 3 Drawing Sheets

(56) References Cited

FOREIGN PATENT DOCUMENTS

Figure 1:
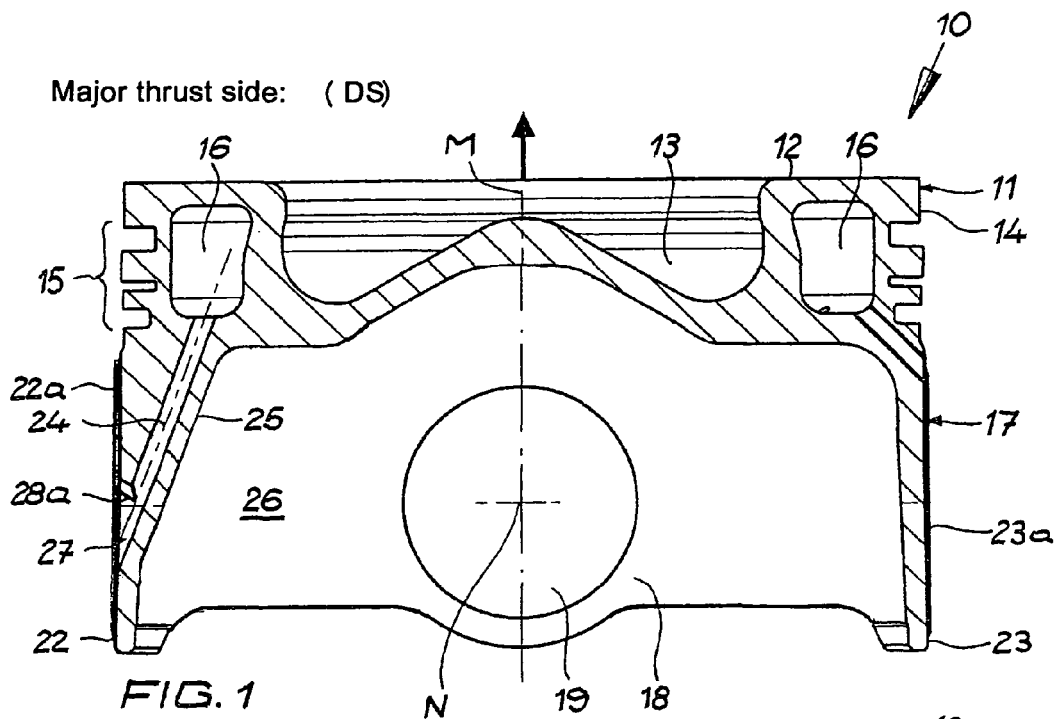

| | | |
|---|---|---|
| DE | 42 43 571 | 6/1994 |
| DE | 44 39 582 | 5/1996 |
| FR | 498 700 | 1/1920 |
| GB | 2 431 218 | 4/2007 |
| JP | 9-060725 | 3/1997 |
| JP | 2005-036690 | 2/2005 |
| JP | 2006-274860 | 10/2006 |
| JP | 2010-053760 | 3/2010 |

OTHER PUBLICATIONS

German Search Report dated Sep. 21, 2011 in German Patent Application No. 10 2011 012 685.6 with English translation of the relevant parts.

\* cited by examiner

Minor thrust side: (GDS)

PISTON FOR AN INTERNAL COMBUSTION ENGINE

CROSS REFERENCE TO RELATED APPLICATIONS

Applicant claims priority under 35 U.S.C. §119 of German Application No. 10 2011 012 685.6 filed on Mar. 1, 2011, the disclosure of which is incorporated by reference.

The present invention relates to a piston for an internal combustion engine, having a piston head and a piston skirt, whereby the piston head has a circumferential ring belt as well as a circumferential cooling channel in the region of the ring belt, and the piston skirt has a working surface assigned to its major thrust side and one assigned to its minor thrust side, in each instance.

In modern internal combustion engines, it is difficult to guarantee optimal lubricant oil supply to the working surfaces. This holds true both for the upward stroke, during which the working surface assigned to the minor thrust of the piston side lies against the corresponding cylinder working surface, and for the downward stroke, during which the working surface assigned to the major thrust side of the piston lies against the corresponding cylinder working surface. During the downward stroke, sufficient lubricant oil supply is of great importance because maximal friction forces between the working surface of the piston and the corresponding cylinder working surface are achieved during this stroke. It is true that the lower edge of the piston skirt is impacted by lubricant oil from the crankshaft housing, but only the lower region of the working surfaces that is assigned to the major thrust side, which is under less stress, can be supplied with lubricant oil in this way. Furthermore, it is true that the oil control ring transports the oil that is present during the downward stroke in the direction of the crankshaft housing. However, this amount of oil is not sufficient to adequately supply the upper region of the working surface that is assigned to the major thrust side, which is subject to great stress, with lubricant oil.

DE 35 06 399 A1 discloses a piston in which a lubricant groove, which is disposed above the working surface assigned to the major thrust side, is connected with the cooling channel by way of a bore. The lubricant groove is supplied with lubricant oil from the cooling channel approximately during the second half of the downward stroke of the piston. However, the lubricant groove brings about the result that during the downward stroke, no hydrodynamic oil film can build up, because the oil runs off immediately from the comparatively large opening, and no oil pressure can build up. Hydrodynamic floating of the piston on a lubricant oil film, as it is desirable in view of the prevailing maximal friction forces, cannot take place.

The task of the present invention consists in further developing a piston of the stated type, in such a manner that during engine operation, an improved lubricant oil supply of the working surface of the piston assigned to the major thrust side is possible.

The solution consists in that a bore that proceeds from the cooling channel is provided, which bore makes a transition into a bore exit, which ends in the working surface assigned to the major thrust side, and is disposed at an incline, in such a manner that the bore exit encloses an acute angle with the center axis of the piston, so that an opening is formed in the working surface, that a deflection surface inclined relative to the working surface and making a transition into same is provided between the bore and the bore exit, and that the working surface assigned to the major thrust side has a depression in the region of the opening, which depression forms at least one oil capture region above the opening.

The piston according to the invention is characterized in that lubricant oil is supplied to the working surface assigned to the major thrust side from the cooling channel, in targeted manner, so that hydrodynamic floating of the piston on a lubricant oil film is made possible. This is made possible, on the one hand, by means of the configuration of the bore exit and, on the other hand, by means of the depression that surrounds the bore exit. During the upward stroke, lubricant oil is pressed out of the cooling channel into the bore and exits through the bore exit. During the subsequent downward stroke, part of the lubricant oil is captured by the deflection surface, and the remainder flows back into the cooling channel. The lubricant oil captured during the course of the downward stroke is distributed in the depression that surrounds the opening, so that an oil pressure is built up. Subsequently, the lubricant oil can pass over from the depression onto the working surface and bring about reliable lubrication of this surface, so that the friction forces that occur during the downward stroke are clearly reduced.

Advantageous further developments are evident from the dependent claims.

The oil capture region preferably extends crosswise to the opening, so that the greatest possible region of the working surface is supplied with lubricant oil.

Particularly preferably, the oil capture region forms an oil collection reservoir on both sides, in each instance. In this way, lubricant oil is preferably collected in the upper region of the working surface and can pass over onto this region of the working surface. In this way, the region of the working surface that is subject to the greatest stress is supplied with lubricant oil in particularly reliable manner.

It is practical if the bore runs in a material thickening formed in the interior of the piston, which can already be introduced during production of the piston blank, for example during forging or casting.

The opening formed by the bore exit can be formed in the working surface below the pin boss center, for example, in order to supply the greatest possible region of the working surface with lubricant oil.

The depression can have a depth of 10 μm to 30 μm, so that on the one hand, enough lubricant oil is captured, but on the other hand, a sufficiently high oil pressure is built up.

Depending on the piston design, the depression can be configured in the material of the piston itself, but it can also be configured in a coating that is applied to the working surface.

A particularly preferred further development provides that at least one further bore that proceeds from the cooling channel is provided, which bore ends in the working surface assigned to the minor thrust side, in the form of a bore opening, and is disposed at an incline, in such a manner that it encloses an acute angle with the center axis of the piston, and that the working surface assigned to the minor thrust side has a depression in the region of the at least one bore opening. During the upward stroke, lubricant oil is pressed out of the cooling channel into the bore, exits through the at least one bore opening, and is captured in the at least one depression. The captured lubricant oil is distributed in the at least one depression. Because lubricant oil is constantly being re-supplied from the cooling channel, an oil pressure can build up here, as well. The lubricant oil can pass over to the working surface from the at least one depression and can bring about reliable lubrication of same, so that the friction forces that occur during the upward stroke are also clearly reduced.

The at least one bore opening preferably opens into the working surface directly below the ring belt, so that the upper-region of the working surface, in particular, is supplied with lubricant oil.

At least two bores can be provided in order to guarantee supply of the working surface with lubricant oil.

The at least one depression is preferably configured to be circular or semicircular, because such a geometry is particularly easy to produce.

The depression can have a depth of 10 µm to 30 µm, so that on the one hand, enough lubricant oil is captured, but on the other hand, a sufficiently high oil pressure is built up.

Depending on the piston design, the depression can be configured in the material of the piston itself, but it can also be configured in a coating that is applied to the working surface.

The present invention is suitable for all piston types and all piston designs.

Figure 2:
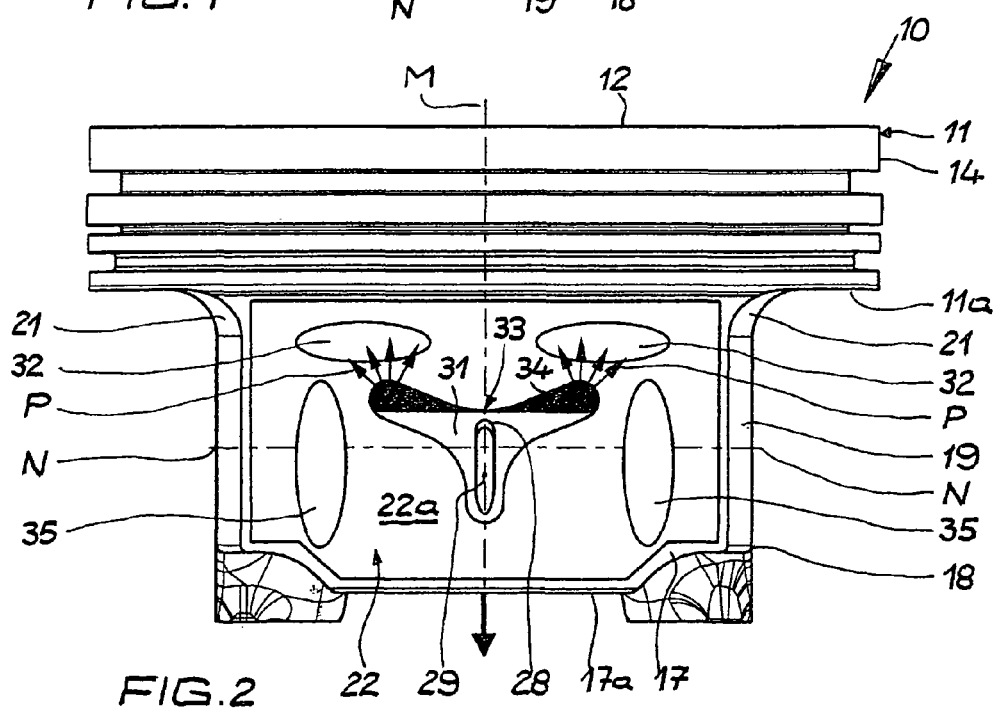
Figure 3:
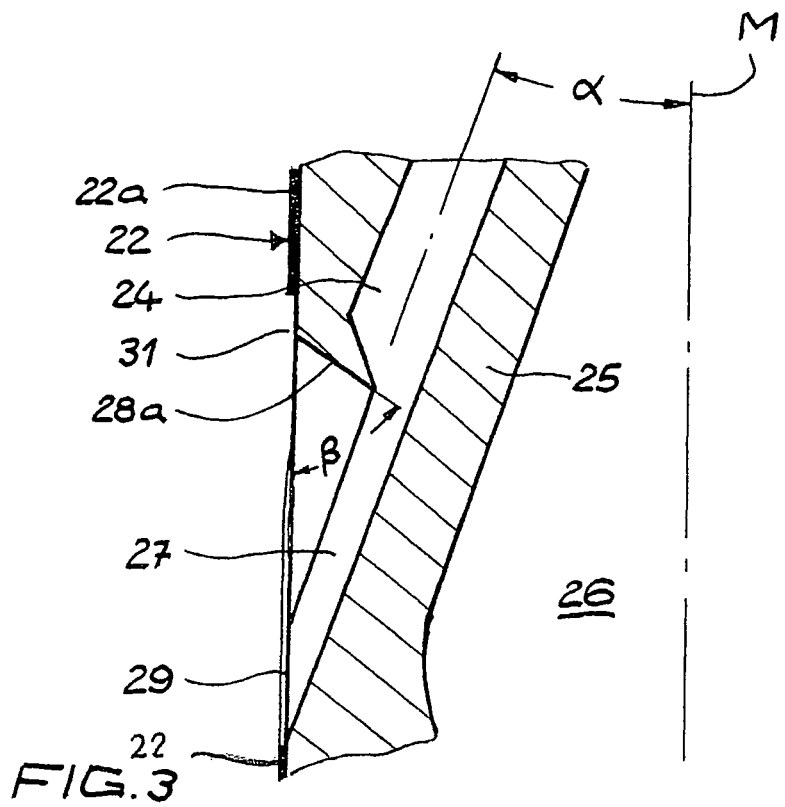
Figure 4:
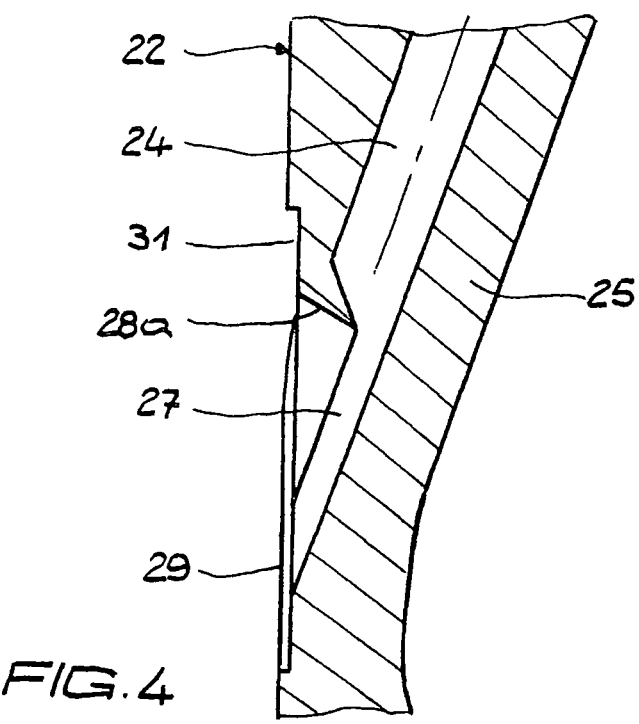
Figure 5:
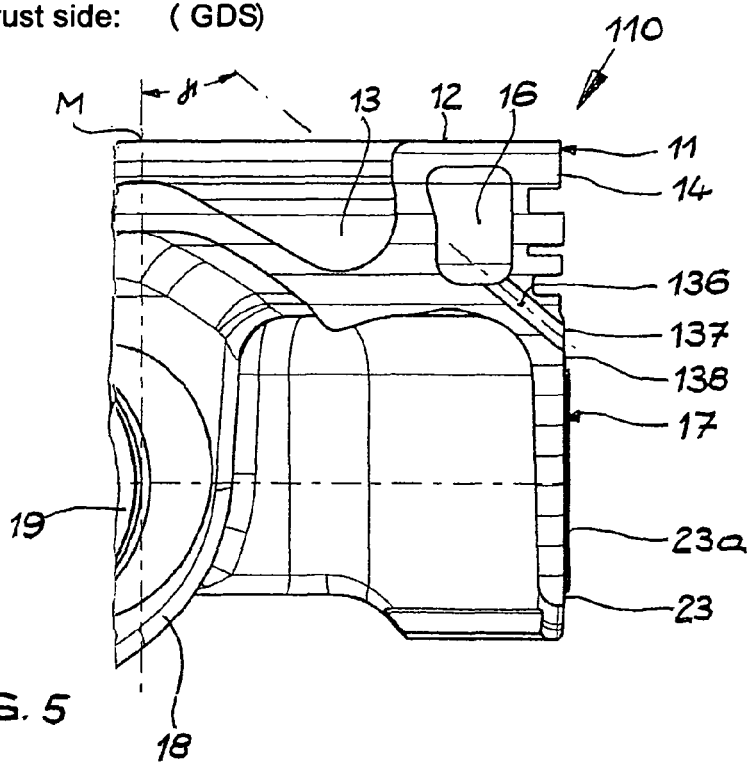
Figure 6:
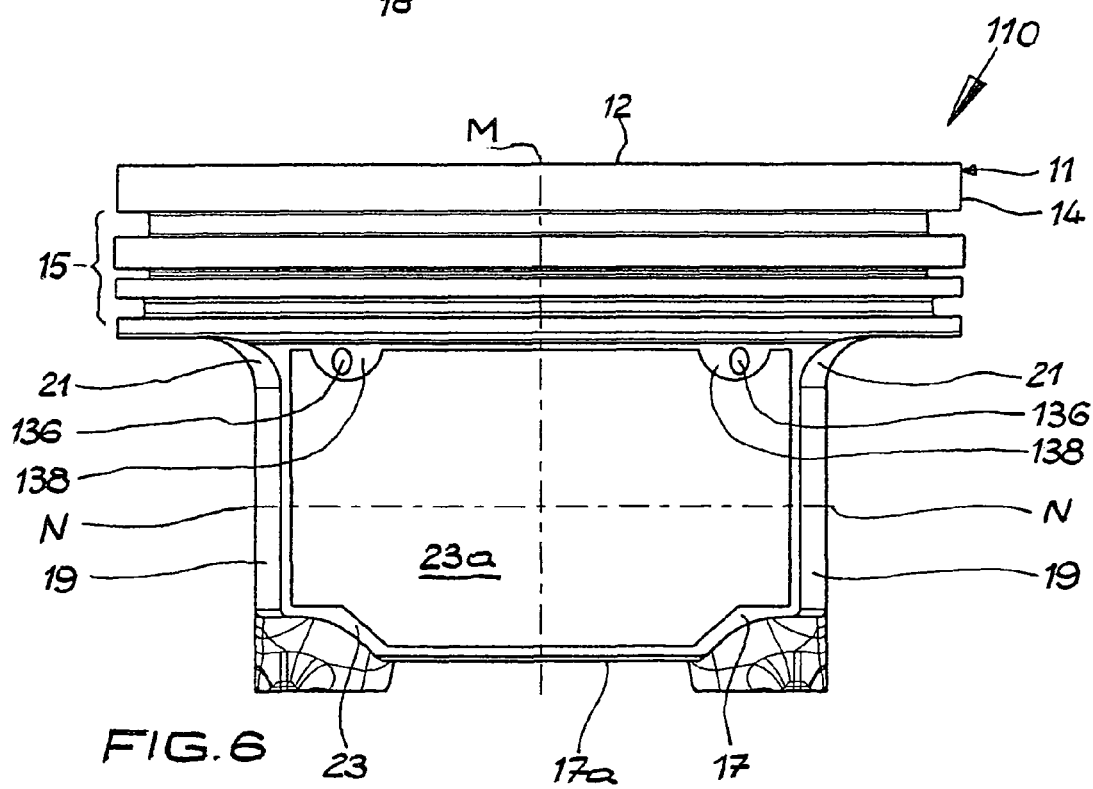

An exemplary embodiment of the present invention will be explained in greater detail below, using the attached drawings. These show, in a schematic representation, not true to scale:

FIG. 1 an exemplary embodiment of a piston according to the invention, in section;

FIG. 2 the piston according to FIG. 1 in a side view rotated by 90°;

FIG. 3 en enlarged partial representation of the piston according to FIG. 1;

FIG. 4 an enlarged partial representation of another exemplary embodiment of a piston according to the invention;

FIG. 5 another exemplary embodiment of a piston according to the invention, in a partial representation, in section;

FIG. 6 the piston according to FIG. 5 in a side view, rotated by 90°.

FIGS. 1 to 3 show a first exemplary embodiment of a piston 10 according to the invention. The piston 10 can be a one-part or multi-part piston. The piston 10 can be produced from a steel material and/or a light metal material. FIGS. 1 to 3 show a one-part box piston 10 as an example. The piston 10 has a piston head 11 having a piston crown 12 that has a combustion bowl 13, a circumferential top land 14, and a ring belt 15 for accommodating piston rings (not shown). At the level of the ring belt 15, a circumferential cooling channel 16 is provided. The piston 10 furthermore has a piston skirt 17 having pin bosses 18 and pin bores 19 for accommodating a piston pin (not shown). The pin bosses 18 are connected with the underside 11a a of the piston head 11 by way of pin boss connections 21. The pin bosses 18 are connected with one another by way of working surfaces 22, 23. In this connection, the working surface 22 is assigned to the major thrust side DS of the piston 10, and the working surface 23 is assigned to the minor thrust side GDS of the piston 10.

The piston 10 according to the invention has a bore 24 that proceeds from the cooling channel 16. The bore 24 is accommodated in a material thickening 25 that is formed in the interior 26 of the piston 10. The material thickening 25 can be introduced during the production of the piston blank such as casting or forging, for example. The bore 24 runs in the direction of the working surface 22 assigned to the major thrust side DS, and makes a transition into a bore exit 27. The bore exit 27 ends in the working surface 22 assigned to the major thrust side DS. The bore exit 27 is disposed to be inclined, in such a manner that it encloses an acute angle a with the center axis M of the piston (see FIG. 3). In the exemplary embodiment, the bore 24 has the same incline as the bore exit 27, so that the bore 24 encloses the same acute angle a with the center axis M of the piston as the bore exit 27. Depending on the design of the piston 10 and the position of the cooling channel 16, however, the bore 24 can also run in deviation from this.

Between the bore 24 and the bore exit 27, a deflection surface. 28 is configured on the working surface side. The deflection surface 28 is inclined relative to the working surface 22, in other words the peak line 28a of the deflection surface 28 that is obtained in cross-section encloses an acute angle β with the working surface 22 (see FIG. 3).

The bore exit 27 ends in the working surface 22, in such a manner that an opening 29 is formed in the working surface 22 (see FIG. 2). In the exemplary embodiment, the opening 29 is configured essentially in slit shape, but depending on the design and size of the piston 10, other shapes are also possible. The opening 29 is formed below the pin boss center N of the working surface 22 in the exemplary embodiment (see FIG. 1).

The working surface 22 assigned to the major thrust side DS has a depression 31 in the region of the opening 29. In the exemplary embodiment, the working surface 22 is provided with a coating 22a, for example Grafal®, and the depression 31 is introduced into the coating 22a or through it, all the way to the piston skirt surface. In the exemplary embodiment, the depression 31 has a depth of about 20 µm. The depression can also be introduced directly into the material of the working surface 22, either because the depth of the depression exceeds the thickness of the coating, or because there is no coating present. The latter embodiment is shown in FIG. 4.

The depression 31 surrounds the opening 29 completely and can be shaped in any manner desired, in principle. In order to guarantee sufficient lubricant oil supply of the working surface 22 in its regions 32 that are subject to particularly great stress, an oil capture region 33 is configured above the opening 29. In the exemplary embodiment, the oil capture region 33 extends essentially crosswise to the opening 29 and is provided with two oil collection reservoirs 34. The oil collection reservoirs 34 are configured to the left and to the right of the opening 29, in each instance (see FIG. 2). In FIG. 2, those regions 35 of the working surface 22 that are supplied with lubricant oil from the lower edge 17a of the piston skirt 17 are additionally marked, The working surface 22 of the piston 10 according to the invention that is assigned to the major thrust side DS is supplied with lubricant oil in targeted manner during engine operation, as follows. During the upward stroke, lubricant oil is pressed into the bore 24 from the cooling channel 16, and exits into the depression through the bore exit 27. During the subsequent downward stroke, part of the lubricant oil is captured by the deflection surface 28, so that this part of the lubricant oil remains in the depression 31. The remaining lubricant oil runs back into the cooling channel 16. The lubricant oil captured in the depression 31 during the course of the downward stroke is distributed in it, so that an oil pressure is built up and the working surface 22 of the piston 10 can float hydrodynamically relative to the corresponding cylinder surface. The lubricant oil is pressed into the oil collection reservoirs 34 of the oil capture region 33 during the downward stroke, and exits from the depression 31 in the direction of the arrows P, over onto the working surface 22. Thus, reliable lubrication of the regions 32 of the working surface 22 that are subject to particularly great stress is guaranteed; the friction forces that occur during the downward stroke are clearly reduced.

FIGS. 5 and 6 show a further preferred embodiment of a piston 110. The piston 110 corresponds to the piston 10 according to FIGS. 1 to 4 in terms of its structure, so that the same structures are provided with the same reference symbols and reference is made to the above figure description relating to FIGS. 1 to 4 in this regard.

The piston 110 according to the invention is characterized by the following additional characteristics.

In the exemplary embodiment, the piston 110 has two additional bores 136 that proceed from the cooling channel 16. The bores 136 run in the direction of the working surface 23 assigned to the minor thrust side GDS and are disposed to be inclined, in such a manner that they enclose an acute angle γ with the center axis M of the piston (see FIG. 5).

The bores 136 end in the working surface 23, in the form of bore openings 137. In the exemplary embodiment, the two bore openings 137 end in the working surface 23 directly below the ring belt 15 of the piston head 11, in the region of the pin boss connections 21 of the piston skirt 17. In the exemplary embodiment, the bore openings 137 are disposed in the upper edge regions of the working surface 23 (see FIG. 6). Of course, merely one or also three or more bore openings can be provided, and then it is practical if they are distributed over the width of the working surface 23.

The working surface 23 assigned to the minor thrust side GDS has a depression 138, in each instance, in the region of the bore openings 137. In the exemplary embodiment, the working surface 23 is provided with a coating 23a, for example Grafal®, and the depressions 138 are introduced into the coating 23a. In the exemplary embodiment, the depressions 138 have a depth of about 20 μm. The depressions 138 can also be introduced directly into the material of the working surface 23, either because the depth of the depressions exceeds the thickness of the coating or because no coating is present.

The depressions 138 surround the bore openings 137 in about semicircular shape in the exemplary embodiment. It is also possible that the bore openings 137 are disposed at a greater distance from the ring belt 15 and that the depressions 138 surround the bore openings 137 in circular shape.

The working surface 23 of the piston 110 according to the invention assigned to the minor thrust side GDS is supplied with lubricant oil, in targeted manner, as follows during engine operation. During the upward stroke, lubricant oil is pressed into the bores 136 from the cooling channel 16, exits through the bore openings 137, and is captured in the depressions 138. The captured lubricant oil is distributed in the depressions 138. Because lubricant oil is constantly re-supplied from the cooling channel 16, an oil pressure can build up here, as well, so that the working surface 23 of the piston 110 can float hydrodynamically with regard to the corresponding cylinder working surface. The lubricant oil can pass over onto the working surface 23 from depressions 138, and can bring about reliable lubrication of this surface, so that the friction forces that occur are also clearly reduced. Because of the preferred arrangement of the bore openings 137 directly below the ring belt 15, the upper region of the working surface 23, which is subject to great stress, is particularly supplied with lubricant oil.

The invention claimed is:

1. A piston for an internal combustion engine, comprising:
a piston head having a circumferential ring belt and a circumferential cooling channel in a region of the ring belt;
a piston skirt having a working surface assigned to its major thrust side (DS) and one assigned to its minor thrust side (GDS),
wherein a bore that proceeds from the cooling channel is provided, which bore makes a transition into a bore exit, which ends in the working surface assigned to the major thrust side (DS), and is disposed at an incline, in such a manner that the bore exit encloses an acute angle (α) with a center axis (M) of the piston, so that an opening is formed in the working surface below the pin boss center (N),
wherein a deflection surface inclined relative to the working surface and making a transition into same is provided between the bore and the bore exit,
wherein the working surface assigned to the major thrust side (DS) has a depression in the region of the opening, which depression surrounds the opening completely and forms at least one oil capture region above the opening,
wherein the oil capture region extends crosswise to the opening, and
wherein the oil capture region forms an oil collection reservoir on both sides to provide lubrication of regions of the working surface that are subject to the greatest stress during engine operation.

2. The piston according to claim 1, wherein the bore runs in a material thickening formed in the interior of the piston.

3. The piston according to claim 1, wherein the depression has a depth of 10 μm to 30 μm.

4. The piston according to claim 1, wherein the depression is configured in the material of the piston.

5. The piston according to claim 1, wherein the working surface has a coating, in which the depression is configured.

* * * * *